US010531168B2

(12) United States Patent
Gu et al.

(10) Patent No.: US 10,531,168 B2
(45) Date of Patent: Jan. 7, 2020

(54) LOW-LATENCY DATA SWITCHING DEVICE AND METHOD

(71) Applicant: Beijing University of Posts and Telecommunications, Beijing (CN)

(72) Inventors: Rentao Gu, Beijing (CN); Yanxia Tan, Beijing (CN); Yuefeng Ji, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 16/396,386

(22) Filed: Apr. 26, 2019

(65) Prior Publication Data

US 2019/0335253 A1 Oct. 31, 2019

(30) Foreign Application Priority Data

Apr. 28, 2018 (CN) .......................... 2018 1 0402837

(51) Int. Cl.
H04Q 11/00 (2006.01)
(52) U.S. Cl.
CPC ..... *H04Q 11/0005* (2013.01); *H04Q 11/0071* (2013.01); *H04Q 2011/0073* (2013.01)
(58) Field of Classification Search
None
See application file for complete search history.

(56) References Cited

U.S. PATENT DOCUMENTS

| | | | |
|---|---|---|---|
| 7,409,712 B1* | 8/2008 | Brooks | H04L 63/1458 713/188 |
| 7,430,164 B2* | 9/2008 | Bare | H04L 29/12009 370/217 |
| 2002/0067733 A1* | 6/2002 | Stoeckl | H04L 12/4608 370/401 |
| 2002/0176367 A1* | 11/2002 | Gross | H04L 41/0896 370/252 |
| 2004/0213224 A1* | 10/2004 | Goudreau | H04L 29/06 370/389 |
| 2009/0154461 A1* | 6/2009 | Kitani | H04L 12/4633 370/392 |

(Continued)

FOREIGN PATENT DOCUMENTS

| | | |
|---|---|---|
| CN | 102217253 A | 10/2011 |
| CN | 102630384 A | 8/2012 |
| CN | 107948077 A | 4/2018 |

*Primary Examiner* — Bunjob Jaroenchonwanit
(74) *Attorney, Agent, or Firm* — Cozen O'Connor

(57) ABSTRACT

Embodiments provides a low-latency data switching device and method. The device includes at least two boundary hardware modules and at least one optical forwarding module. The first boundary hardware module is configured for matching, with a first data forwarding table, signaling message information for a signaling message sent by a host router, acquiring a service request sent by the host router, and searching a second data forwarding table for an optical channel for the service request. The at least one optical forwarding module is configured for mapping the service request to a second service request, and forwarding the second service request in sequence via the optical channel, the second boundary hardware module is configured for acquiring next-hop routing information of the data switching device for the service request, and forwarding the service request to the next-hop router of the data switching device.

10 Claims, 5 Drawing Sheets

(56) References Cited

U.S. PATENT DOCUMENTS

| | | | | |
|---|---|---|---|---|
| 2009/0323694 A1* | 12/2009 | Miki | H04L 49/3009 | 370/392 |
| 2010/0118891 A1* | 5/2010 | Nakajima | H04L 12/4633 | 370/474 |
| 2012/0189009 A1* | 7/2012 | Shekhar | H04L 45/021 | 370/392 |
| 2013/0100851 A1* | 4/2013 | Bacthu | H04L 12/18 | 370/254 |
| 2014/0064104 A1* | 3/2014 | Nataraja | H04L 61/103 | 370/248 |
| 2014/0195666 A1* | 7/2014 | Dumitriu | H04L 12/4625 | 709/223 |
| 2015/0092783 A1* | 4/2015 | Kano | H04L 12/4633 | 370/392 |
| 2015/0222543 A1* | 8/2015 | Song | H04L 12/4641 | 370/392 |
| 2015/0295816 A1* | 10/2015 | Roper | H04L 45/26 | 709/224 |
| 2015/0334057 A1* | 11/2015 | Gao | H04L 49/351 | 370/392 |
| 2015/0341135 A1 | 11/2015 | Xia et al. | | |
| 2016/0073278 A1* | 3/2016 | Roessler | H04L 49/70 | 370/252 |
| 2016/0103745 A1* | 4/2016 | Zhou | G06F 11/2094 | 714/6.3 |
| 2016/0373356 A1* | 12/2016 | Xu | H04L 45/18 | |
| 2018/0152503 A1* | 5/2018 | Holgers | H04L 67/10 | |
| 2019/0036868 A1* | 1/2019 | Chandrashekhar | H04L 61/103 | |
| 2019/0132243 A1* | 5/2019 | Tamizkar | H04L 45/50 | |
| 2019/0140942 A1* | 5/2019 | Hu | H04L 45/38 | |
| 2019/0166108 A1* | 5/2019 | Larson | H04L 29/12066 | |

\* cited by examiner

LOW-LATENCY DATA SWITCHING DEVICE AND METHOD

TECHNICAL FIELD

The present invention relates to the field of communication technology, and in particular, to a low-latency data switching device and method.

BACKGROUND

In recent years, the rapid development of mobile edge computing technology, 4K videos, VR (Virtual Reality), Internet of Things and other emerging services has brought huge changes in the entire IT (Information Technology) industry, resulting in rapid growth of Internet traffic. In order to ensure the quality of service and management of the network, there is great development space for AI (Artificial Intelligence) technology with the ability to cope with highly complex situations.

The development and operation of the above services depend on low-latency transmission and switching of the network. At present, the optimization of the delay in the transmission and switching at the network layer is achieved by the continuous development of the router technology. However, the switching of the router is based on address forwarding at the network layer (OSI (Open System Interconnection) layer 3), and can only be achieved by removing data structures of layer 1 and layer 2 layer-by-layer. Therefore, it is difficult to achieve a very low delay based on the router forwarding and switching at layer 3. In contrast, the advantages of optical switching are remarkable. Based on the switching and forwarding at the physical layer (OSI layer 1) or the media layer (OSI layer 0), a single-node forwarding delay at the level of 10 us may be achieved. How to take advantages of optical switching to realize low-latency data switching has become an important issue urgent to be solved.

SUMMARY

A purpose of embodiments of the present invention is to provide a low-latency data switching device and method, so as to reduce the delay in the information interaction process. The specific technical solutions are provided as follows.

In order to achieve the above purpose of the present invention, a first aspect of an embodiment of the present invention provides a low-latency data switching device, including at least two boundary hardware modules and at least one optical forwarding module; wherein, the at least two boundary hardware modules include a first boundary hardware module and a second boundary hardware module, wherein, the first boundary hardware module is configured for matching, with a first data forwarding table, signaling message information for a signaling message sent by a host router, if the matching is successful, acquiring a service request sent by the host router, and searching a second data forwarding table for an optical channel for the service request; wherein, the first data forwarding table is a forwarding table for matching the signaling message sent by the host router; the second data forwarding table is configured for determining the optical channel for the service request sent by the host router;

the at least one optical forwarding module is configured for mapping, for each optical forwarding module that is determined to be used for forwarding the service request based on the optical channel, the service request to a second service request with a granularity corresponding to a granularity of this optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module; wherein, the second boundary hardware module is a boundary hardware module that is located in the data switching device and connected to a destination host IP network;

the second boundary hardware module is configured for receiving the service request, acquiring, from a third data forwarding table, next-hop routing information of the data switching device for the service request, and forwarding the service request to a next-hop router of the data switching device; wherein, the third data forwarding table is a routing table for storing routing information.

Optionally, the device further includes an information processing module configured for receiving an ARP request sent from the host router via the first boundary hardware module, replying to the host router with a MAC address of the data switching device requested by the ARP request, and establishing the first data forwarding table based on the pre-acquired various parameter information, the MAC address and the IP address of the data switching device.

Optionally, the at least two boundary hardware modules include multiple first boundary hardware modules and multiple second boundary hardware modules;

the information processing module is specifically configured for establishing a routing protocol forwarding table based on pre-acquired identification information and port information of the first boundary hardware modules, an IP address and an MAC address of each of host servers connected to the first boundary hardware modules, and the IP address and the MAC address of the data switching device; and encapsulating the routing protocol forwarding table to generate the first data forwarding table to be delivered to a corresponding first boundary hardware module.

Optionally, the information processing module is specifically configured for analyzing the ARP request to acquire an IP address and an MAC address of the host router; acquiring port information and identification information of a first boundary hardware module that receives the ARP request; establishing Table 1 by using the IP address and the MAC address of the host router; establishing Table 2 by using the IP address of the host router and the port information of the first boundary hardware module that receives the ARP request; establishing Table 3 by using the port information of the first boundary hardware module that receives the ARP request, the identification information of the first boundary hardware module, and port information and identification information of the second boundary hardware module; combining Table 1, Table 2 and Table 3 to form Table 4 including the IP address, the MAC address, the port information and the identification information of the first and second boundary hardware modules; and encapsulating Table 4 to generate the second data forwarding table to be delivered to the corresponding first boundary hardware module, optical forwarding module and second boundary hardware module.

Optionally, the information processing module is specifically configured for acquiring previous-hop routing information about the sending of the signaling message, next-hop routing information about the reception of the signaling message, the IP address and the MAC address of the data switching device to establish a routing table; and encapsulating the routing table to generate the third data forwarding table to be delivered to the corresponding first boundary hardware module, optical forwarding module and second boundary hardware module.

Optionally, the at least two boundary hardware modules include multiple first boundary hardware modules and multiple second boundary hardware modules;

the device further includes:

a path calculation module, configured for calculating a routing path between each of the first boundary hardware modules and each of the second boundary hardware modules in the data switching device; wherein, the routing path is an optical channel path through which the mapped service request passes.

In order to achieve the above purpose of the present invention, an embodiment of the present invention provides a data transmission method, which is applied to a data switching device, the data switching device includes at least two boundary hardware modules and at least one optical forwarding module, and the at least two boundary hardware modules include a second boundary hardware module, the method includes:

matching, with a first data forwarding table, signaling message information for a signaling message sent by a host router, if the matching is successful, acquiring a service request sent by the host router, and searching a second data forwarding table for an optical channel for the service request; wherein, the first data forwarding table is a forwarding table for matching the signaling message sent by the host router; the second data forwarding table is configured for determining the optical channel for the service request sent by the host router;

mapping, for each optical forwarding module that is determined to be used for forwarding the service request based on the optical channel, the service request to a second service request with a granularity corresponding to a granularity of this optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module;

receiving the service request, acquiring, from a third data forwarding table, next-hop routing information of the data switching device for the service request, and forwarding the service request to a next-hop router of the data switching device; wherein, the third data forwarding table is a routing table for storing routing information.

Optionally, the at least two boundary hardware modules further include a first boundary hardware module, and the first data forwarding table is established by:

receiving an ARP request sent from the host router via the first boundary hardware module, replying to the host router with a MAC address of the data switching device requested by the ARP request, and establishing the first data forwarding table based on pre-acquired various parameter information, the MAC address and the IP address of the data switching device.

Optionally, the at least two boundary hardware modules include multiple first boundary hardware modules and multiple second boundary hardware modules;

establishing the first data forwarding table based on pre-acquired various parameter information, the MAC address and the IP address of the data switching device, includes:

establishing a routing protocol forwarding table based on pre-acquired identification information and port information of the first boundary hardware modules, an IP address and an MAC address of each of host servers connected to the first boundary hardware modules, identification information and port information of the second boundary hardware modules, an IP address and a MAC address of each of host servers connected to the second boundary hardware modules, and the IP address and the MAC address of the data switching device; and encapsulating the routing protocol forwarding table to generate the first data forwarding table to be delivered to a corresponding first boundary hardware module.

Optionally, the second data forwarding table is established by:

acquiring an IP address and an MAC address of the host router;

acquiring port information and identification information of the first boundary hardware module that receives the ARP request;

establishing Table 1 by using the IP address and the MAC address of the host router;

establishing Table 2 by using the IP address of the host router and the port information of the first boundary hardware module that receives the ARP request;

establishing Table 3 by using the port information of the first boundary hardware module that receives the ARP request, the identification information of the first boundary hardware module, port information and identification information of the second boundary hardware module;

combining Table 1, Table 2 and Table 3 to form Table 4 including the IP address, the MAC address, the port information and the identification information of the first and second boundary hardware modules; and encapsulating Table 4 to generate the second data forwarding table to be delivered to the corresponding first boundary hardware module, optical forwarding module and second boundary hardware module.

Optionally, the third data forwarding table is established by:

acquiring the previous-hop routing information about the sending of the signaling message, the next-hop routing information about the reception of the signaling message, the IP address and the MAC address of the data switching device to establish a routing table; and encapsulating the routing table to generate a third data forwarding table to be delivered to the corresponding first boundary hardware module, optical forwarding module and second boundary hardware module.

Optionally, the method further includes:

calculating a routing path between each of the first boundary hardware modules and each of the second boundary hardware modules in the data switching device; wherein, the routing path is an optical channel path through which the mapped service request passes.

To achieve the above purpose of the present invention, in another aspect of an embodiment of the present invention, an electronic apparatus is further disclosed. The electronic apparatus includes a processor, a communication interface, a memory and a communication bus; wherein the processor, the communication interface, and the memory are communicated with each other via the communication bus;

the memory is configured for storing a computer program;

the processor is configured for perform the steps of any one of the above data transmission methods when executing the program stored in the memory.

In order to achieve the above purpose of the present invention, in another aspect of an embodiment of the present invention, a computer readable storage medium is further disclosed. The computer readable storage medium stores instructions that, when executed by a computer, cause the computer to perform the steps of any one of the above data transmission methods.

In order to achieve the above purpose of the present invention, an embodiment of the present invention further discloses a computer program product including instructions that, when executed by a computer, cause the computer to perform the steps of any one of the above data transmission methods.

Embodiments of the present invention provide a low-latency data switching device and method, so as to reduce the delay in the information interaction process. When the source host IP network is the previous-hop router of the data switching device, and the destination host IP network is the next-hop router of the data switching device, the information is received by the first boundary hardware module of the data switching device according to the embodiment of the present invention. Then the optical channel for the service request is determined by using the first data forwarding table and the second data forwarding table. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

BRIEF DESCRIPTION OF THE DRAWINGS

In order to more clearly illustrate the embodiments of the present invention or the technical solutions in the prior art, the drawings that need to be used in the embodiments or the prior art description will be briefly described below.

DETAILED DESCRIPTION

The technical solutions in the embodiments of the present invention will be described below in conjunction with the accompanying drawings in the embodiments of the present invention.

The present invention aims to replace the core switching component of a router with optical switching, thereby forming a low-latency switching structure based on a physical layer and a media layer inside the devices. At the same time, supporting a network layer protocol at a first boundary hardware module, a second boundary hardware module and a data switching device to converge the device with the router in terms of external characteristics, so that the uniformity of low-latency and compatibility is well achieved.

Figure 1:
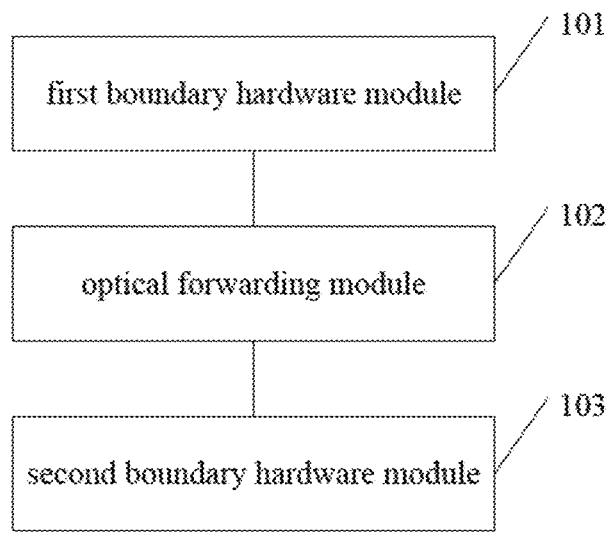
FIG. 1 shows a schematic structural diagram of a low-latency data switching device according to an embodiment of the present invention.

In order to achieve the above purpose of the present invention, in a first aspect of the embodiment of the present invention, a low-latency data switching device is disclosed, as shown in FIG. 1. FIG. 1 shows a schematic structural diagram of a low-latency data switching device according to an embodiment of the present invention. The device includes at least two boundary hardware modules and at least one optical forwarding module 102. Wherein, the at least two boundary hardware modules include a first boundary hardware module 101 and a second boundary hardware module 103.

Wherein, the first boundary hardware module 101 is configured for matching, with a first data forwarding table, signaling message information for a signaling message sent by a host router, if the matching is successful, acquiring a service request sent by the host router, and searching a second data forwarding table for an optical channel for the service request. Wherein, the first data forwarding table is a forwarding table for matching the signaling message sent by the host router; the second data forwarding table is configured for determining an optical channel for the service request sent by the host router.

The data switching device according to the embodiment of the present invention integrates the optical network and the electrical network, thereby implementing the transmission and forwarding of data sent by a source host IP network to a destination host IP network by means of the data switching device according to the embodiment of the present invention. The data switching device includes at least the first boundary hardware module 101, the optical forwarding module 102 and the second boundary hardware module 103. The first boundary hardware module 101 represents a boundary hardware module connected to the source host IP network, and the second boundary hardware module 103 represents a boundary hardware module connected to the destination host IP network. There is no fixed order between the first and second boundary hardware modules, which are determined as the first and second with respect to the current data transmission direction.

In the embodiment of the present invention, the first boundary hardware module 101 is connected to the source host IP network, the second boundary hardware module 103 is connected to the destination host IP network, and the first boundary hardware module 101 is connected to the at least one optical forwarding module 102 and thus to the second boundary hardware module 103 to form the data switching device according to an embodiment of the present invention.

Figure 2:
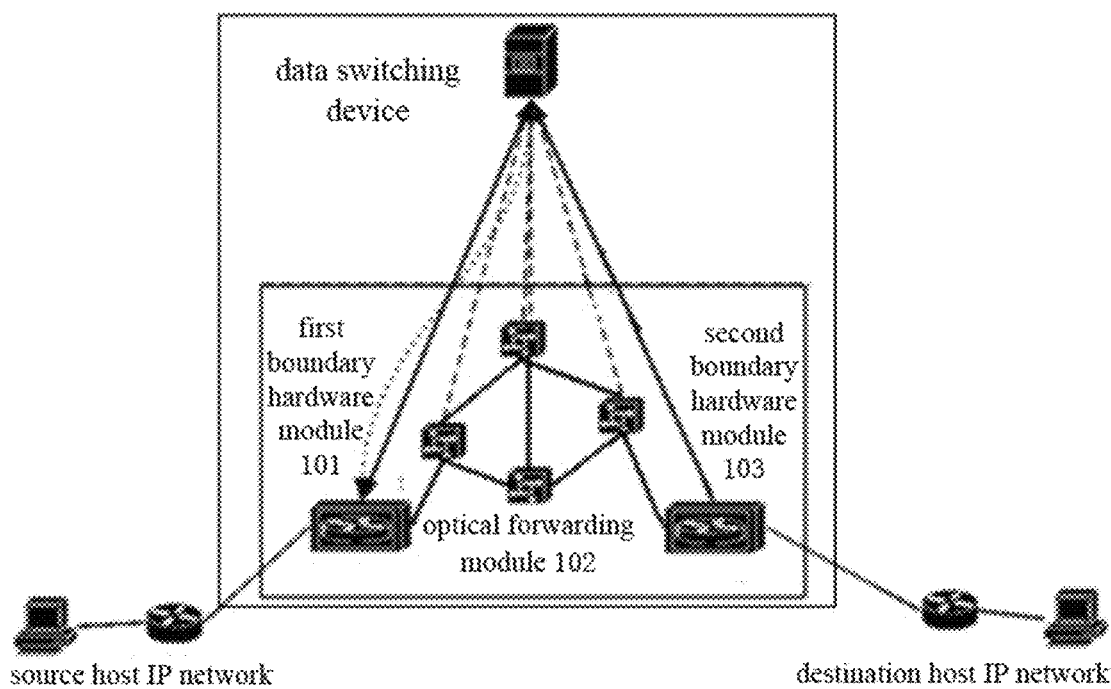
FIG. 2 shows a schematic diagram of networking of a low-latency data switching device according to an embodiment of the present invention.

In order to better illustrate the process of data transmission between the source host and the destination host by the data switching device according to an embodiment of the present invention transmitting data. FIG. 2 shows a schematic diagram of networking of the low-latency data switching device according to an embodiment of the present invention. In FIG. 2, the source host IP network is connected to the data switching device according to the embodiment of the present invention that is connected to the destination host IP network, thereby implementing data transmission between the source host and the destination host. Specifically, a router in the source host IP network is connected to the first boundary hardware module 101 of the data switching device according to the embodiment of the present invention, and a router in the destination host IP network is connected to the second boundary hardware module 103 of the data switching device according to the embodiment of the present invention. The process of data transmission between the source host and the destination host by the data switching device according to the embodiment of the present invention is specifically illustrated below.

This step relates to a process in which the first boundary hardware module 101 receives information sent by the source host. Specifically, the source host router, which establishes connection with the data switching device according to the embodiment of the present invention, sends a signaling message. This signaling message is to inform the data switching device according to the embodiment of the present invention of the communication message protocol used by the source host, and inform the data switching device according to the embodiment of the present invention of routing information of the source host and the IP address and MAC address of the source host.

The data switching device according to the embodiment of the present invention may establish a first data forwarding table for matching the signaling message sent by the corresponding host router, based on various parameter information, such as the MAC address thereof, the IP address thereof, and the pre-acquired parameter information of each IP network connected to the data switching device according to the embodiment of the present invention, and deliver the first data forwarding table to a corresponding first boundary hardware module 101.

The data switching device according to the embodiment of the present invention may further establish a second data forwarding table that is configured for determining an optical channel for the service request sent by the host router, based on various parameter information, such as the MAC address thereof, the IP address thereof, link information and port information of the first boundary hardware module 101, the optical forwarding module 102 and the second boundary hardware module 103, and routing information about the sending of the signaling message.

After receiving the signaling message sent by the source host router, the first boundary hardware module 101 matches the signaling message with the pre-established first data forwarding table. If the matching is successful, the source host router may formally send a service request to be transmitted to the destination host.

After acquiring the service request sent by the source host router, the first boundary hardware module 101 searches the pre-established second data forwarding table for an optical channel for the service request. An optical channel represents a channel formed by an optical forwarding path along which a service request sent by the source host is transmitted to the destination host. The optical channel may be divided based on time division, wavelength division, space division and the like, or a combination thereof.

The at least one optical forwarding module is configured for mapping, for each optical forwarding module 102 that is determined to be used for forwarding the service request, the service request to a second service request with a granularity corresponding to the granularity of the optical forwarding module 102, and forwarding the second service request to the last optical forwarding module 102 in sequence via the optical channel, such that the last optical forwarding module 102 de-maps the second service request to the service request and forwards the service request to the second boundary hardware module 103. Wherein, the second boundary hardware module 103 is a boundary hardware module located in the data switching device and connected to the destination host IP network.

During the process of information transmission, after the optical channel for the service request is determined, the service request is transmitted inside the data switching device to the second boundary hardware module 103 of the data switching device through this optical channel. In the embodiment of the present invention, the optical forwarding module 102 of the data switching device are used to transmit the service request through this optical channel. The optical channel is a forwarding path of the service request inside the data switching device, and the forwarding path is a path determined based on the passed optical forwarding module 102. Thus, the service request is forwarded through the optical forwarding module.

Each optical forwarding module 102 has its own data granularity. After the service request is received, the service request needs to be mapped to a second service request with a granularity corresponding to the granularity of the optical forwarding module 102. The last optical forwarding module 102, corresponding to the optical channel through which this service request is forwarded, de-maps the second service request to a service request sent by the source host router. For example, the service request sent by the source host router is 1 G, and the optical forwarding module A, which is determined based on the optical channel and first forwards the service request, has a granularity of 1.25G The optical forwarding module A adds a packet header to the service request, maps the service request to a second service request of 1.25G and then forwards the second service request to the next optical forwarding module 102. When the last optical forwarding module 102 is reached, the packet header of the second service request is removed, and the second service request is restored to a service request of 1 G which is then forwarded to the second boundary hardware module 103 by the last optical forwarding module 102.

The second boundary hardware module 103 is configured for receiving the service request, acquiring, from a third data forwarding table, next-hop routing information of the data switching device for the service request, and forwarding the service request to the next-hop router of the data switching device. Wherein, the third data forwarding table is a routing table for storing routing information.

In the above step, after the service request is forwarded to the second boundary hardware module 103 by the optical forwarding module 102, the next-hop routing information of the data switching device for the service request is obtained from the third data forwarding table of the second boundary hardware module 103. Wherein, the next-hop routing information is the routing information of the destination host IP network as shown in FIG. 2. Thus, the service request is forwarded to the destination host IP network by the second boundary hardware module 103.

A low-latency data switching device provided by the embodiment of the invention achieves the purpose of reducing network resource overhead and improving network resource utilization. When the source host IP network is the previous-hop router of the data switching device, and the destination host IP network is the next-hop router of the data switching device, the information is received by the first boundary hardware module of the data switching device according to the embodiment of the present invention. Then, the optical channel for the service request is determined by using the first and second data forwarding tables. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

Optionally, in an embodiment of the data switching device of the present invention, the device further includes an information processing module, configured for receiving an address resolution protocol (ARP) request sent from the host router via the first boundary hardware module, replying to the host router with the MAC address of the data switching device requested by the ARP request, and establishing a first data forwarding table based on the pre-acquired various parameter information, the MAC address, and the IP address of the data switching device.

The embodiment of the present invention provides a step of establishing a neighbor relationship between the data switching device and an IP network. Specifically, the host router sends an ARP request by using a communication protocol, and the information processing module of the data switching device according to the embodiment of the present invention receives the ARP request, i.e., a request to establish an association between the host and the data switching device. Wherein, the communication protocol may be a standard openflow protocol.

Specifically, the information processing module of the data switching device according to the embodiment of the present invention, after receiving the address resolution protocol (ARP) request sent from the source host router via the first boundary hardware module, acquires address information carried by the ARP request, including the IP address and the MAC address of the source host that sends the ARP request, and the routing information of the source host router. The data switching device, after identifying the IP address and the MAC address of the source host that sends the ARP request, returns its own MAC address to the source host to inform the source host that a neighbor relationship has been established with the data switching device.

At the same time, the information processing module of the data switching device will further acquire the pre-acquired parameter information, the routing information, and the address information of the source host to establish a first data forwarding table. The first data forwarding table according to the embodiment of the present invention is a flow table for matching messages sent by the host router.

Establishing the first data forwarding table may be specifically implemented as follows.

A routing protocol forwarding table is established based on the identification information and the port information of the first boundary hardware modules, the internet protocol (IP) address and the MAC address of each of host servers connected to the first boundary hardware modules, and the IP address and the MAC address of the data switching device; and is then encapsulated to generate a first data forwarding table to be delivered to a corresponding first boundary hardware module.

Specifically, a routing protocol flow table regarding the first boundary hardware module is established based on the pre-acquired identification information and port information of the first boundary hardware module connected to the source host, the pre-acquired IP address and MAC address of each source host server connected to the first boundary hardware module and the pre-acquired IP address and MAC address of the data switching device, and is then encapsulated based on the standard openflow protocol to generate a first data forwarding table to be delivered to the first boundary hardware module.

In addition, the establishment of a neighbor relationship between the data switching device and the destination host is similar to that between the source host and the data switching device, and the generation of a first data forwarding table to be delivered to the boundary hardware module connected to the destination host is similar to the generation of a first data forwarding table to be delivered to the boundary hardware module connected to the source host, which are not described herein again.

It can be seen that in the embodiment of the present invention, a connection between the data switching device and the IP network may be established, and a first data forwarding table to be delivered to each boundary hardware module is generated, so as to subsequently facilitate the matching of message information sent by the router in the IP network with information contained in each flow table in the first data forwarding table of the data switching device and to implement the message intercommunication between the data switching device and the IP network's boundary router.

Optionally, in an embodiment of the data switching device of the present invention, the information processing module is specifically configured for analyzing the ARP request to acquire the IP address and MAC address of the host router; acquiring the port information and the identification information of the first boundary hardware module that receives the ARP request; establishing Table 1 by using the IP address and MAC address of the host router; establishing Table 2 by using the IP address of the host router and the port information of the first boundary hardware module that receives the ARP request; establishing Table 3 by using the port information of the first boundary hardware module that receives the ARP request, the identification information of the first boundary hardware module, the port information and the identification information of the second boundary hardware module; combining Table 1, Table 2 and Table 3 to form Table 4 including the IP address, MAC address, port information and identification information; encapsulating Table 4 to generate a second data forwarding table to be delivered to the corresponding first boundary hardware module, optical forwarding module and second boundary hardware module.

In an embodiment of the present invention, a second data forwarding table is established as follows. The second data forwarding table according to the embodiment of the present invention is a forwarding table for determining an optical channel for a service request sent by the host router and storing routing information.

The specific establishment process is as follows:

Table 1 is established for the address information of the host router, that is, the IP address and MAC address of the host router are stored in one table.

Table 2 is established based on the IP address of the host router and the port information of the first boundary hardware module that receives the ARP request. In the embodiment of the present invention, one Table 2 is established for the IP address of the source host and the port information of the first boundary hardware module that receives the ARP request sent by the source host.

In the embodiment of the present invention, Table 3 is established for the port information of the first boundary hardware module that receives the ARP request sent by the source host, the identification information of the first boundary hardware module, the port information and the identification information of the second boundary hardware module.

Table 1, Table 2 and Table 3 are combined to form Table 4 including the IP address of the source host, the MAC address of the source host, the port information PORT1 of the first boundary hardware module that receives the ARP request sent by the source host, the identification information DPID1 of the first boundary hardware module, the port information PORT2 of the second boundary hardware module and the identification information DPID2 of the second boundary hardware module. Table 4 may be represented as MAC-IP-PORT1-DPID1-PORT2-DPID2. Further, Table 4 is encapsulated using encapsulation technique to form a second data forwarding table.

It can be seen that, by using the established second data forwarding table in the embodiment of the present invention, the optical channel for the service request sent by the source host to the destination host is determined by the second data forwarding table, and then the service request is forwarded through the optical network inside the switching device, and the delay caused by multiple interaction transmissions of data in the original optical network and electrical network is reduced.

Optionally, in an embodiment of the data switching device of the present invention, the information processing module is specifically configured for acquiring the previous-hop routing information about the sending of the signaling message, the next-hop routing information about the reception of the signaling message, the IP address and the MAC address of the data switching device to establish a routing table; and encapsulating the routing table to generate a third data forwarding table to be delivered to the corresponding first boundary hardware module, the optical forwarding module and the second boundary hardware module.

In an embodiment of the present invention, a routing table, i.e., a third data forwarding table according to an embodiment of the present invention is established as follows.

The previous-hop routing information about the sending of the signaling message, the next-hop routing information about the reception of the signaling message, the IP address and the MAC address of the data switching device are acquired to establish a routing table.

The routing information of the source host that sends the signaling message is used as the previous-hop routing information of the data switching device, and the routing information of the destination host that receives the signaling message is used as the next-hop routing information of the data switching device. Based on the previous-hop routing information, the next-hop routing information and the IP address and the MAC address of the data switching device according to the embodiment of the present invention, a routing table including the routing information of the source host and the routing information of the destination host is established.

Based on the pre-acquired link information of the data switching device, Table 4 and the routing table, a routing path forwarding table is generated. The routing path forwarding table is encapsulated to generate the third data forwarding table to be delivered to the corresponding first boundary hardware module, optical forwarding module and second boundary hardware module.

It can be seen that, in the embodiment of the present invention, a third data forwarding table containing various routing information on data transmission by the data switching device may be pre-established, and then the next-hop router of the data switching device for the transmitted data may be directly determined by using the third data forwarding table during the actual data transmission process, and finally the data was output from the data switching device to the IP network where the next-hop router is located.

Optionally, in an embodiment of the data switching device of the present invention, the device further includes:

a path calculation module, configured for calculating the routing path between each of the first boundary hardware modules and each of the second boundary hardware modules in the data switching device; wherein, the routing path is the path of an optical channel through which the mapped service request passes.

Figure 3:
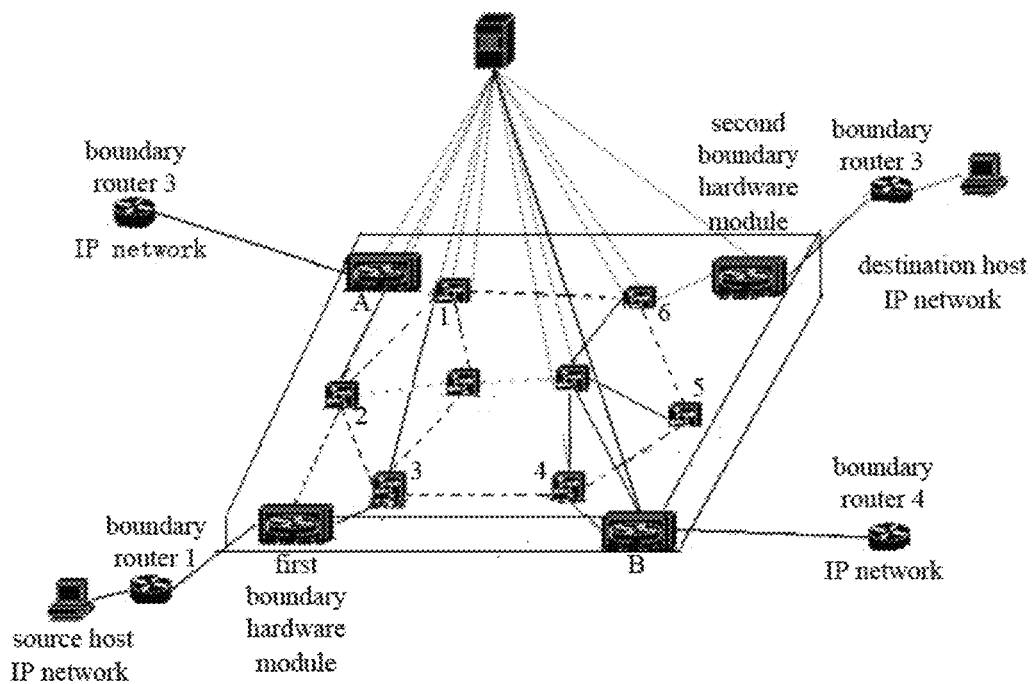
FIG. 3 shows a schematic diagram of networking of a low-latency data switching device according to an embodiment of the present invention.

In an embodiment of the present invention, the routing path is calculated as follows. Referring to FIG. 3, there is shown a schematic diagram of networking of a low-latency data switching device according to an embodiment of the present invention. Four IP networks are contained in FIG. 3, i.e., a source host IP network, a destination host IP network, and two remaining IP networks. Wherein, A and B represent boundary hardware modules of the data switching device according to the embodiment of the present invention, and 1-6 represent six optical forwarding modules included in the data switching device according to the embodiment of the present invention, respectively. The source host IP network includes a source host and a boundary router 1, and the destination host IP network includes a destination host and a boundary router 2. Each IP network is connected to the data switching device according to the embodiment of the present invention through a boundary router. That is, the boundary router 1 of the source host IP network is connected to the first boundary hardware module according to the embodiment of the present invention, and the boundary router 2 of the destination host IP network is connected to the second boundary hardware module according to the embodiment of the present invention. Each of the two remaining IP networks is connected to a boundary hardware module of the data switching device through the boundary router 3, and to a boundary hardware module of the data switching device through the boundary router 4, respectively.

In the embodiment of the present invention, a first boundary hardware module connected to the boundary router 1 of the source host receives a service request sent by the boundary router 1 of the source host; and then the service request is forwarded to the second boundary hardware module of the corresponding destination host through multiple optical forwarding modules connected to the first boundary hardware module, and is then forwarded to the boundary router 2 of the destination host through the second boundary hardware module, implementing the transmission process of the service request from the source host to the destination host.

In the embodiment of the present invention, the routing paths between first boundary hardware modules and the second boundary hardware module are calculated by the path calculation module of the data switching device, so that a suitable routing path for the service request sent by the source host can be found from all routing paths for delivery to the corresponding destination host. In order to improve data transmission efficiency, the routing path may be the shortest path between the first boundary hardware modules and the second boundary hardware modules.

It can be seen that the routing path between every two boundary hardware modules may be determined according to the embodiment of the present invention, which can facilitate the boundary routers of the source host and the destination host to find a corresponding routing path during information transmission, and makes it easy to optimize the routing path.

Figure 4:
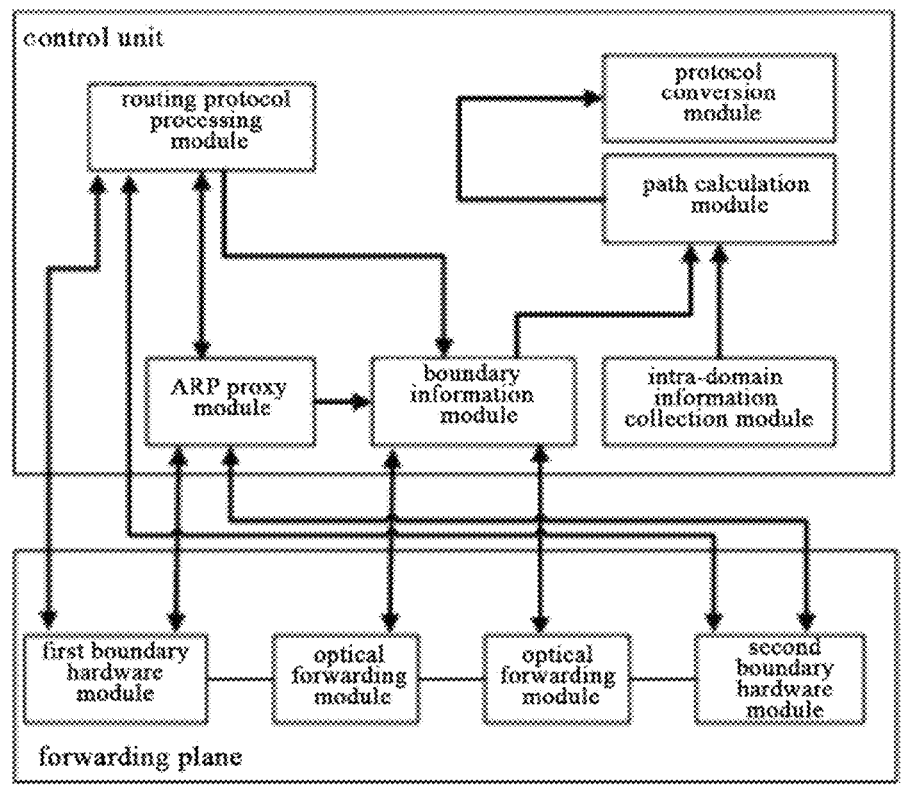
FIG. 4 shows a schematic structural diagram of a low-latency data switching device according to an embodiment of the present invention.

In order to better illustrate the data switching device according to an embodiment of the present invention, an embodiment of the present invention further discloses a low-latency data switching device as shown in FIG. 4. FIG. 4 shows a schematic structural diagram of a low-latency data switching device according to an embodiment of the present invention. In FIG. 4, the data switching device includes a control unit and a forwarding plane. The control unit performs the function of the information processing module in the embodiment of the present invention, i.e., controls and processes a data stream. The forwarding plane functions to perform actual data forwarding based on the control unit's control over the data stream.

Wherein, the control unit specifically includes a routing protocol processing module, a protocol conversion module, a path calculation module, an ARP proxy module, a boundary information module and an intra-domain information collection module. The forwarding plane specifically includes a first boundary hardware module, a second boundary hardware module and multiple optical forwarding modules.

In the embodiment of the present invention, for example, the optical forwarding module is a piece of OTN (Optical Transport Network) forwarding equipment, and the protocol between the control unit and the boundary hardware module is the openflow protocol, the information interaction process inside the data switching device in the embodiment of the present invention are illustrated as follows.

The intra-domain information collection module is provided in the control unit, and is configured for collecting the topology, port working state and link state of each piece of OTN forwarding equipment in the data switching device. At the same time, the intra-domain information collection module further needs to collect the port information and address information of the first and second boundary hardware modules, the traffic statistics of each port of the OTN forwarding equipment, the number of matches for routing information of each piece of OTN forwarding equipment, and the traffic, delay, and QoS (Quality of Service) of the link and the like. Further, the intra-domain information collection module periodically sends the collected information to the path calculation module.

In this embodiment, the intra-domain information collection module runs the LLTD (Link Layer Topology Discovery) protocol, and collects the network topology information, link state, address and port information of the OTN forwarding equipment of the data switching device according to the embodiment of the present invention.

The ARP proxy module is provided in the control unit, and is configured for receiving an ARP request sent from the host boundary router via the first boundary hardware module, encapsulating reply information by using a standard openflow protocol, and replying to the boundary router in the IP network with the encapsulated reply information, such that a neighbor relationship between the boundary router in the IP network and the data switching device of the present invention is established, and an ARP address table is generated to record the service request of the ARP request.

Specifically, after receiving the ARP request sent by the boundary hardware module, the ARP proxy module checks the ARP address table of the ARP request to confirm whether it is processed repeatedly. If not, a table entry is added, and then a routing protocol table entry is established based on the characteristics of the signaling message and is sent to the protocol conversion module. And then a first data forwarding table is generated for matching the signaling message, and is delivered to the first boundary hardware module of the data switching device, and the received ARP request is sent to the boundary information module for analyzing.

The boundary information module is provided in the control unit and is configured for receiving and processing the ARP request forwarded by the ARP proxy module. After receiving the ARP request forwarded by the ARP proxy module, the boundary information module assigns the OTN forwarding equipment connected to the first boundary hardware module that receives the ARP request as boundary OTN forwarding equipment, and analyzes the ARP packet of the ARP request to acquire the IP address and MAC address of the external router, the address information and port number of the boundary hardware module that receives the ARP request.

Three tables are established based on the information obtained from the ARP request. Specifically, Table 1 is established by using the IP address and MAC address of the host router; Table 2 is established by using the IP address of the host router and the port information PORT of the first boundary hardware module that receives the ARP request; Table 3 is established by using the port information PORT of the first boundary hardware module that receives the ARP request, the identification information DPID of the first boundary hardware module. Table 1, Table 2 and Table 3 are combined to form Table 4 including the IP address, MAC address, port information PORT and identification information DPID, that is, to form the second data forwarding table, MAC-IP-PORT-DPID table, according to the embodiment of the present invention. At the same time, the boundary information module periodically sends the collected port information PORT and the identification information DPID of the boundary hardware module to the path calculation module to update the routing path.

The path calculation module is provided in the control unit, and is configured for calculating and establishing a routing path between various pieces of boundary OTN forwarding equipment inside the data switching device; at the same time, establishing a routing table based on the previous-hop routing information about the sending of the signaling message, the next-hop routing information about the reception of the signaling message, the IP address and MAC address of the data switching device; and generating a routing path forwarding table based on the pre-acquired link information of the data switching device, Table 4 and the routing table. Wherein, the information of the boundary OTN forwarding equipment is obtained from the information provided by the first boundary information module, and the topology and link information between various pieces of OTN forwarding equipment are obtained from the information provided by the information collection module.

The protocol conversion module is provided in the control unit, and is configured for performing protocol-based encapsulation of the path forwarding table generated by the path calculation module to generate a second data forwarding table; and delivering the second data forwarding table to the first boundary hardware module, the optical forwarding module and the second boundary hardware module of the OTN forwarding equipment of the forwarding plane, such that the service request sent by the IP network is forwarded inside the data switching device according to the embodiment of the present invention based on the second data forwarding table.

The routing protocol processing module is provided in the control unit, and is configured for performing protocol-based analysis of the signaling message sent by the first boundary hardware module, and establishing a routing protocol forwarding table that assigns port information of the first boundary hardware module that is a TCP (Transmission Control Protocol) message flow table entry with a port number of 179 in this embodiment; then, encapsulating the routing protocol forwarding table to generate the first data forwarding table to be delivered to a corresponding first boundary hardware module, such that the message intercommunication between the data switching device according to the embodiment of the present invention and the boundary router of the IP network is implemented through the first boundary hardware module.

The first boundary hardware module is located in the forwarding plane, and is configured for receiving ARP information sent by the IP network, sending the ARP information to the boundary information module of the control unit for processing, matching, with a first data forwarding table, signaling message information for the signaling message sent by the host router in the IP network, if the matching is successful, acquiring the service request sent by the host router in the IP network, and searching a second data forwarding table for an optical channel for the service request. Specifically, the TCP message with a port number of 179 is matched.

The optical forwarding module is located in the forwarding plane, and is configured for mapping, for each optical forwarding module that is determined to be used for forwarding the service request based on the optical channel, the service request to a second service request with a granularity corresponding to the granularity of the optical forwarding module, and forwarding the second service request to the last optical forwarding module in sequence via the optical channel, such that the last optical forwarding module de-maps the second service request to the service request and forwards the service request to the second boundary hardware module. At the same time, the optical forwarding module runs the link discovery protocol, and periodically uploads the topology information to the intra-domain information module of the control unit.

The second boundary hardware module is located in the forwarding plane, and is configured for receiving the service request, acquiring, from a third data forwarding table, next-hop routing information of the data switching device for the service request, and forwarding the service request to a next-hop router of the data switching device; wherein, the third data forwarding table is a routing table for storing routing information.

In addition, the second boundary hardware module may further return a routing result of the optical channel for the current service request to the control unit; the control unit updates the network blocking probability based on the service condition of the optical channel, and periodically updating the routing path between various pieces of boundary OTN forwarding equipment based on the link state of the OTN forwarding equipment. Wherein, the update period is greater than the maximum circulation time of the service request in the optical switching device.

It can be seen that, the data switching device according to the embodiment of the present invention can implement high-speed transmission and processing of services of an IP network, thereby completing data forwarding with the IP network and the optical network integrated.

Figure 5:
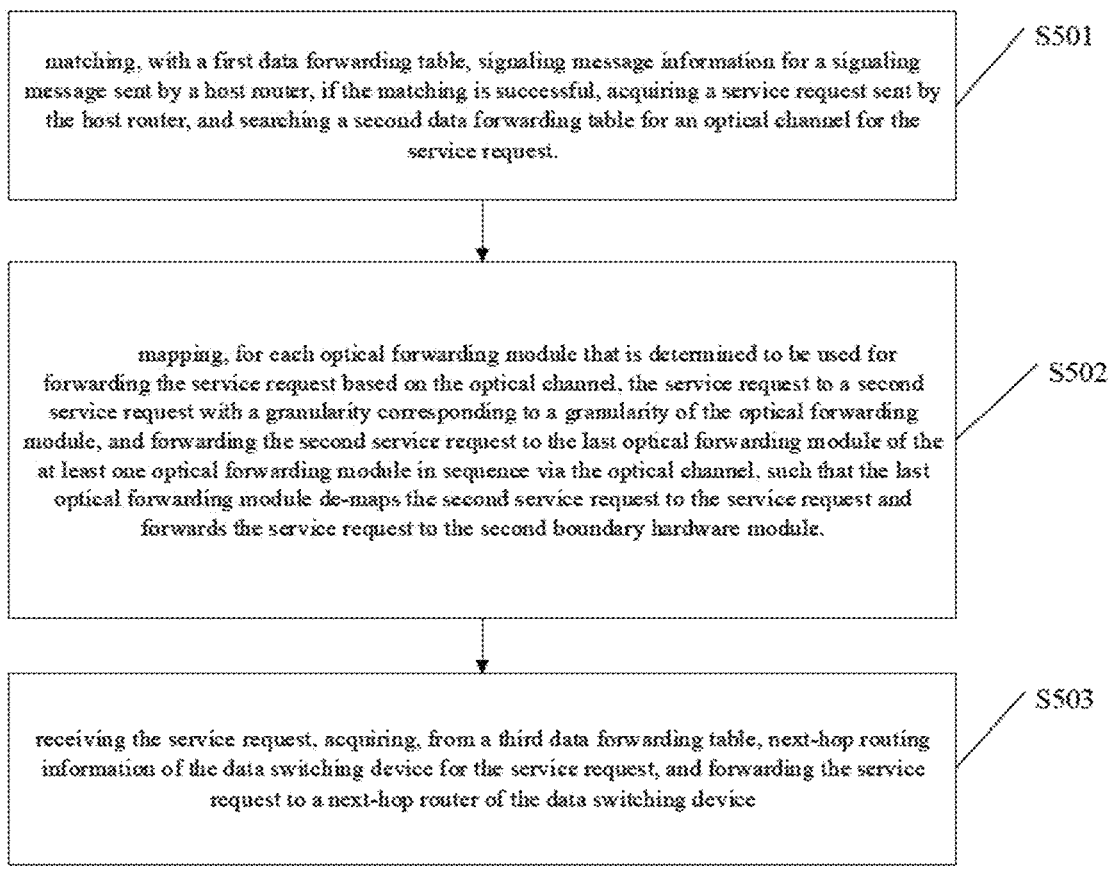
FIG. 5 shows a flowchart of a data transmission method according to an embodiment of the present invention.

In order to achieve the above purpose of the present invention, in a second aspect of the embodiment of the present invention, a data transmission method is disclosed, as shown in FIG. 5. It should be noted that the data transmission method of the present invention is applied to the above data switching device. The data switching device includes at least two boundary hardware modules and at least one optical forwarding module, and the at least two boundary hardware modules include a second boundary hardware module. The specific implementation thereof is similar to that of the above data switching device, which is not described again in detail below.

FIG. 5 shows a flowchart of data transmission method according to an embodiment of the present invention. The method includes:

S501, matching, with a first data forwarding table, signaling message information for a signaling message sent by a host router, if the matching is successful, acquiring a service request sent by the host router, and searching a second data forwarding table for an optical channel for the service request. Wherein, the first data forwarding table is a forwarding table for matching the signaling message sent by the host router; the second data forwarding table is configured for determining the optical channel for the service request sent by the host router.

S502, mapping, for each optical forwarding module that is determined to be used for forwarding the service request based on the optical channel, the service request to a second service request with a granularity corresponding to a granularity of the optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module.

S503, receiving the service request, acquiring, from a third data forwarding table, next-hop routing information of the data switching device for the service request, and forwarding the service request to a next-hop router of the data switching device; wherein, the third data forwarding table is a routing table for storing routing information.

The data transmission method provided by the embodiment of the present invention achieves the purpose of reducing network resource overhead and improving network resource utilization. When the source host IP network is the previous-hop router of the data switching device, and the destination host IP network is the next-hop router of the data switching device, the information is received by the first boundary hardware module of the data switching device according to the embodiment of the present invention. Then the optical channel for the service request is determined by using the first data forwarding table and the second data forwarding table. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

Optionally, in an embodiment of the data transmission method of the present invention, the at least two boundary hardware modules further include a first boundary hardware module, and the first data forwarding table is established by:

receiving an address resolution protocol (ARP) request sent from the host router via the first boundary hardware module, replying to the host router with the MAC address of the data switching device requested by the ARP request, and establishing the first data forwarding table based on the pre-acquired various parameter information, the MAC address, and the IP address of the data switching device.

Optionally, in an embodiment of the data transmission method of the present invention, establishing a first data forwarding table based on the pre-acquired various parameter information, the MAC address, and the IP address of the data switching device, includes:

establishing a routing protocol forwarding table based on the pre-acquired identification information and port information of the first boundary hardware module, the IP address and the MAC address of each of host servers connected to the first boundary hardware modules, the identification information and port information of the second boundary hardware modules, the IP address and MAC address of each of host servers connected to the second boundary hardware modules, and the IP address and MAC address of the data switching device; and encapsulating the routing protocol forwarding table to generate the first data forwarding table to be delivered to a corresponding first boundary hardware module.

Optionally, in an embodiment of the data transmission method of the present invention, the second data forwarding table is established by:

acquiring the IP address and MAC address of the host router;

acquiring the port information and identification information of the first boundary hardware module that receives the ARP request;

establishing Table 1 by using the IP address and MAC address of the host router;

establishing Table 2 by using the IP address of the host router and the port information of the first boundary hardware module that receives the ARP request;

establishing Table 3 by using the port information of the first boundary hardware module that receives the ARP request, and the identification information of the first boundary hardware module, and port information and identification information of the second boundary hardware module;

combining Table 1, Table 2 and Table 3 to form Table 4 including the IP address, the MAC address, and the port information and identification information of the first and second boundary hardware modules;

encapsulating Table 4 to generate the second data forwarding table to be delivered to the corresponding first boundary hardware module, optical forwarding module and second boundary hardware module.

Optionally, in an embodiment of the data transmission method of the present invention, the third data forwarding table is established by:

acquiring the previous-hop routing information about the sending of the signaling message, the next-hop routing information about the reception of the signaling message, the IP address and the MAC address of the data switching device to establish a routing table; and encapsulating the routing table to generate a third data forwarding table to be delivered to the corresponding first boundary hardware module, optical forwarding module and second boundary hardware module.

Optionally, in an embodiment of the data transmission method of the present invention, the method further includes:

calculating a routing path between each of the first boundary hardware modules and each of the second boundary hardware modules in the data switching device; wherein, the routing path is an optical channel path through which the mapped service request passes.

Figure 6:
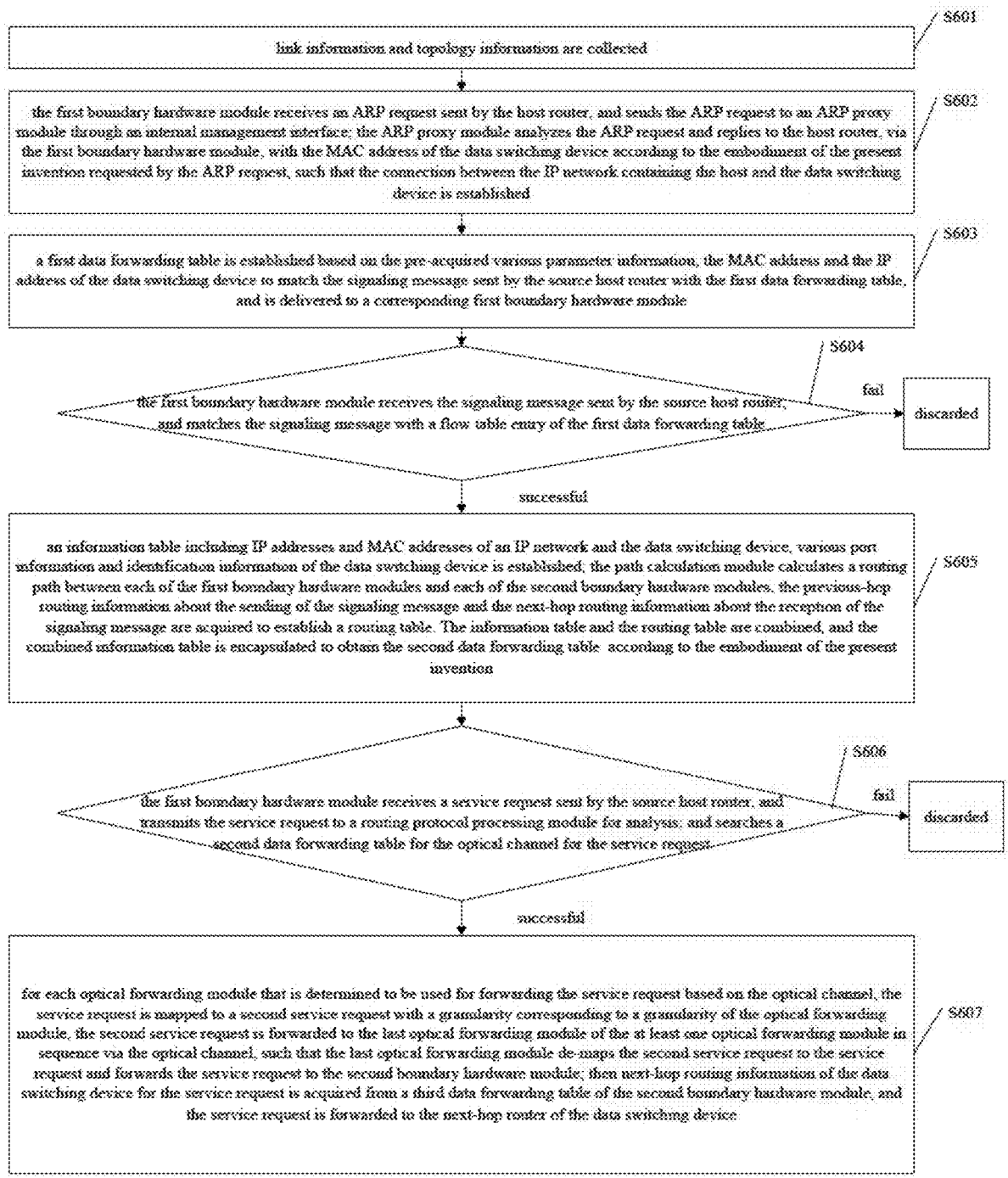
FIG. 6 shows a flowchart of a data transmission method according to an embodiment of the present invention.

In order to better illustrate the data transmission method according to the embodiment of the present invention, the embodiment of the present invention further discloses a data transmission method. Referring to FIG. 6, the data transmission method may be applied to the data switching device shown in FIG. 4. FIG. 6 shows a flowchart of data transmission method according to an embodiment of the present invention.

S601, link information and topology information of the data switching device according to the embodiment of the present invention are collected.

S602, the first boundary hardware module receives an ARP request sent by the host router, and sends the ARP request to the ARP proxy module through an internal management interface; the ARP proxy module analyzes the ARP request and replies to the host router, via the first boundary hardware module, with the MAC address of the data switching device according to the embodiment of the present invention requested by the ARP request, such that the connection between the IP network containing the host and the data switching device according to the embodiment of the present invention is established.

S603, a first data forwarding table is established based on the pre-acquired various parameter information, the MAC address and the IP address of the data switching device according to the embodiment of the present invention to match the signaling message sent by the source host router with the first data forwarding table, and is delivered to a corresponding first boundary hardware module.

S604, the first boundary hardware module receives the signaling message sent by the source host router, and matches the signaling message with a flow table entry of the first data forwarding table. If the matching is successful, S605 is performed. Otherwise, it indicates that the signaling message cannot be identified by the data switching device according to the embodiment of the present invention, and then the signaling message is directly discarded.

S605, an information table including IP addresses and MAC addresses of an IP network and the data switching device, various port information and identification information of the data switching device is established; the path calculation module calculates a routing path between each of the first boundary hardware modules and each of the second boundary hardware modules; the previous-hop routing information about the sending of the signaling message and the next-hop routing information about the reception of the signaling message are acquired to establish a routing table. The information table and the routing table are combined, and the combined information table is encapsulated to obtain the second data forwarding table according to the embodiment of the present invention.

S606, the first boundary hardware module receives a service request sent by the source host router, and then transmits the service request to a routing protocol processing module for analysis; and searches a second data forwarding table for the optical channel for the service request. If the optical channel for the service request is found successfully, S607 is preformed, otherwise, the service request is discarded.

S607, for each optical forwarding module that is determined to be used for forwarding the service request based on the optical channel, the service request is mapped to a second service request with a granularity corresponding to a granularity of the optical forwarding module, the second service request is forwarded to the last optical forwarding module of the at least one optical forwarding module in sequence via the optical channel, such that the last optical forwarding module de-maps the second service request to the service request and forwards the service request to the second boundary hardware module; then next-hop routing information of the data switching device for the service request is acquired from a third data forwarding table of the second boundary hardware module, and the service request is forwarded to the next-hop router of the data switching device.

Figure 7:
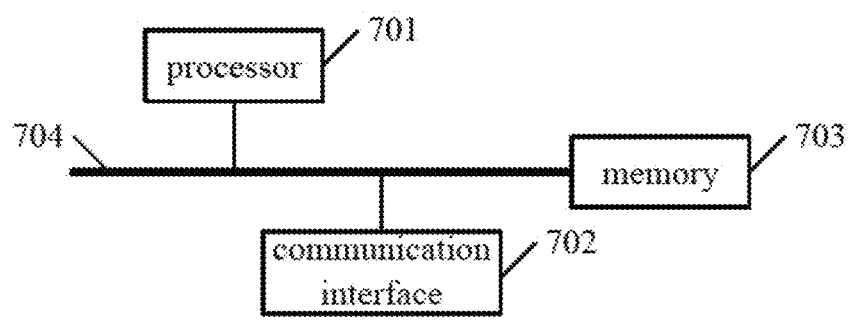
FIG. 7 shows a schematic structural diagram of an electronic apparatus according to an embodiment of the present invention.

In order to achieve the above purpose of the present invention, an embodiment of the present invention further discloses an electronic apparatus, as shown in FIG. 7. FIG. 7 shows a schematic structural diagram of an electronic apparatus according to an embodiment of the present invention. The electronic apparatus includes a processor 701, a communication interface 702, a memory 703 and a communication bus 704, wherein, the processor 701, the communication interface 702 and the memory 703 are communicated with each other via the communication bus 704;

the memory 703 is configured for storing a computer program;

the processor 701 is configured for preforming the following steps when executing the program stored in the memory 703:

matching, with a first data forwarding table, signaling message information for a signaling message sent by a host router, if the matching is successful, acquiring a service request sent by the host router, and searching a second data forwarding table for an optical channel for the service request. Wherein, the first data forwarding table is a forwarding table for matching the signaling message sent by the host router; the second data forwarding table is configured for determining the optical channel for the service request sent by the host router;

mapping, for each optical forwarding module that is determined to be used for forwarding the service request based on the optical channel, the service request to a second service request with a granularity corresponding to a granularity of the optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module;

receiving the service request, acquiring, from a third data forwarding table, next-hop routing information of the data switching device for the service request, and forwarding the service request to the next-hop router of the data switching device; wherein, the third data forwarding table is a routing table for storing routing information.

The communication bus 704 in the above electronic apparatus can be a peripheral component interconnect (PCI) bus or an extended industry standard architecture (EISA) bus and the like. The communication bus 704 may include an address bus, a data bus, a control bus and the like. For illustration, it is only represented by one thick line in the figure, which does not mean there is only one communication bus or one type of communication bus.

The communication interface 702 is configured for communication between the above electronic apparatus and other terminal apparatuses.

The memory 703 may include a random access memory (RAM), or a non-volatile memory (NVM), for example at least a disk memory. Optionally, the memory 703 may also be at least one storage device located away from the above processor 701.

The processor 701 may be a general-purpose processor, such as a central processing unit (CPU), a network processor (NP), or the like; it may also be a digital signal processor (DSP), an application specific integrated circuit (ASIC), a field-programmable gate array (FPGA) or another programmable logic device, a discrete gate or a transistor logic device, discrete hardware assemblies.

The electronic apparatus provided by the embodiment of the present invention achieves the purpose of reducing network resource overhead and improving network resource utilization. When the source host IP network is the previous-hop router of the data switching device, and the destination host IP network is the next-hop router of the data switching device, the information is received by the first boundary hardware module of the data switching device according to the embodiment of the present invention. Then the optical channel for the service request is determined by using the first data forwarding table and the second data forwarding table. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

In order to achieve the above purpose of the present invention, in another aspect of an embodiment of the present invention, a computer readable storage medium is further disclosed. The computer readable storage medium stores instructions that, when executed by a computer, perform the steps of one of the above data transmission methods.

The computer readable storage medium provided by the embodiment of the present invention achieves the purpose of reducing network resource overhead and improving network resource utilization. When the source host IP network is the previous-hop router of the data switching device, and the destination host IP network is the next-hop router of the data switching device, the information is received by the first boundary hardware module of the data switching device according to the embodiment of the present invention. Then the optical channel for the service request is determined by using the first data forwarding table and the second data forwarding table. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

In order to achieve the above purpose of the present invention, in another aspect of an embodiment of the present invention, a computer program product is further disclosed, including instructions that, when executed by a computer, cause the computer to perform the steps of one of the above data transmission methods.

The computer program product including instructions provided by the embodiment of the present invention achieves the purpose of reducing network resource overhead and improving network resource utilization. When the source host IP network is the previous-hop router of the data switching device, and the destination host IP network is the next-hop router of the data switching device, the information is received by the first boundary hardware module of the data switching device according to the embodiment of the present invention. Then the optical channel for the service request is determined by using the first data forwarding table and the second data forwarding table. The service request is forwarded to the second boundary hardware module through the corresponding optical channel by the optical forwarding module. Finally, the second boundary hardware module acquires the next-hop routing information of the data switching device according to the embodiment of the present invention for the service request by using the second data forwarding table, and forwards the service request to the next-hop router, i.e. the destination host IP network. The data switching device according to the embodiment of the invention has the same attribute characteristics as the IP router, i.e., can easily join the current IP network, thereby implementing the data plane integration of the IP network and the optical network. In addition, the information sent by the source host IP network is directly transmitted to the destination host IP network through the optical network constructed by the data switching device according to the embodiment of the present invention, without transmitting data interactively back and forth between the IP network and the optical network. Thereby, the problem in the prior art that a large delay occurs in the information transmission process due to that the information needs to be transmitted interactively multiple times between the optical network and the electrical network during data transmission between the source host and the destination host is solved, such that the delay in data transmission when data is interactively transmitted by the optical network of the data switching device according to the embodiment of the present invention is reduced. Finally, the data switching device according to the embodiment of the present invention may meet the delay demand of emerging technologies such as AI and 5G.

The above embodiments can be implemented in whole or in part by software, hardware, firmware, or any combination thereof. When computer program instructions are loaded onto and executed by a computer, the processes or functions according to embodiments of the present invention are generated in whole or in part. The computer may be a general purpose computer, a special purpose computer, a computer network, or another programmable device. Computer instructions may be stored in a computer readable storage medium or transmitted from one computer readable storage medium to another. For example, computer instructions may be transmitted from one website, computer, server or data center to another by wired connection (e.g., a coaxial cable, an optical fiber, a digital subscriber line (DSL)) or wirelessly (e.g., by infrared waves, microwaves, etc.). The computer readable storage medium may be any available medium that can be accessed by a computer or may be a data storage terminal apparatus, such as a server, a data center, or the like, including one or more integrated available mediums. The available medium may be a magnetic medium (e.g., a floppy disk, a hard disk, a magnetic tape), an optical medium (e.g., DVD), or a semiconductor medium (e.g., a solid state disk (SSD), etc.).

It should be noted that the relationship terms used herein, such as "first", "second" and the like are only used to distinguish one entity or operation from another, but do not necessarily require or imply that there is an actual relationship or order between these entities or operations. Moreover, the terms "include", "comprise", or any variants thereof are intended to cover a non-exclusive inclusion, such that processes, methods, articles, or terminal apparatuses, including a series of elements, include not only those elements that have been listed, but also other elements that is not specifically listed or the elements intrinsic to these processes, methods, articles, or terminal apparatuses. Without further limitations, elements defined by the wording "comprise(s) a/an . . . " do not exclude additional identical elements in the processes, methods, articles, or terminal apparatuses that includes the listed elements.

All of the embodiments in the description are described in a correlated manner, and identical or similar parts in various embodiments can refer to one another. In addition, the description for each embodiment focuses on the differences from other embodiments. In particular, the embodiments of the electronic apparatus, the computer readable storage medium and the computer program product are described briefly, since they are substantially similar to the embodiment of the method, and the related contents can refer to the description of the embodiment of the method.

The description above are simply preferable embodiments of the present invention, and are not intended to limit the scope of protection of the present invention. Any modifications, alternatives, improvements, or the like within the spirit and principle of the present invention shall be included within the scope of protection of the present invention.

The invention claimed is:

1. A low-latency data switching device, comprising at least two boundary hardware modules and at least one optical forwarding module; wherein, the at least two boundary hardware modules comprise a first boundary hardware module and a second boundary hardware module, wherein, the first boundary hardware module is configured for matching, with a first data forwarding table, signaling message information for a signaling message sent by a host router, if the matching is successful, acquiring a service request sent by the host router, and searching a second data forwarding table for an optical channel for the service request; wherein, the first data forwarding table is a forwarding table for matching the signaling message sent by the host router; the second data forwarding table is configured for determining the optical channel for the service request sent by the host router;

the at least one optical forwarding module is configured for mapping, for each optical forwarding module that is determined to be used for forwarding the service request based on the optical channel, the service request to a second service request with a granularity corresponding to a granularity of this optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module; wherein, the second boundary hardware module is a boundary hardware module that is located in the data switching device and connected to a destination host IP network;

the second boundary hardware module is configured for receiving the service request, acquiring, from a third data forwarding table, next-hop routing information of the data switching device for the service request, and forwarding the service request to a next-hop router of the data switching device; wherein, the third data forwarding table is a routing table for storing routing information.

2. The device of claim 1, wherein, the device further comprises an information processing module configured for receiving an ARP request sent from the host router via the first boundary hardware module, replying to the host router with a MAC address of the data switching device requested by the ARP request, and establishing the first data forwarding table based on the pre-acquired various parameter information, the MAC address and the IP address of the data switching device.

3. The device of claim 2, wherein, the at least two boundary hardware modules comprise multiple first boundary hardware modules and multiple second boundary hardware modules;

the information processing module is specifically configured for establishing a routing protocol forwarding table based on pre-acquired identification information and port information of the first boundary hardware modules, an IP address and an MAC address of each of host servers connected to the first boundary hardware modules, and the IP address and the MAC address of the data switching device; and encapsulating the routing protocol forwarding table to generate the first data forwarding table to be delivered to a corresponding first boundary hardware module.

4. The device of claim 2, wherein, the information processing module is specifically configured for analyzing the ARP request to acquire an IP address and an MAC address of the host router; acquiring port information and identification information of a first boundary hardware module that receives the ARP request; establishing Table 1 by using the IP address and the MAC address of the host router; establishing Table 2 by using the IP address of the host router and the port information of the first boundary hardware module that receives the ARP request; establishing Table 3 by using the port information of the first boundary hardware module that receives the ARP request, the identification information of the first boundary hardware module, and port information and identification information of the second boundary hardware module; combining Table 1, Table 2 and Table 3 to form Table 4 comprising the IP address, the MAC address, the port information and the identification information of the first and second boundary hardware modules; and encapsulating Table 4 to generate the second data forwarding table to be delivered to the corresponding first boundary hardware module, optical forwarding module and second boundary hardware module.

5. The device of claim 2, wherein, the information processing module is specifically configured for acquiring previous-hop routing information about the sending of the signaling message, next-hop routing information about the reception of the signaling message, the IP address and the MAC address of the data switching device to establish a routing table; and encapsulating the routing table to generate the third data forwarding table to be delivered to the corresponding first boundary hardware module, optical forwarding module and second boundary hardware module.

6. The device of claim 4, wherein, the at least two boundary hardware modules comprise multiple first boundary hardware modules and multiple second boundary hardware modules;
the device further comprises:
a path calculation module, configured for calculating a routing path between each of the first boundary hardware modules and each of the second boundary hardware modules in the data switching device; wherein, the routing path is an optical channel path through which the mapped service request passes.

7. A data transmission method, wherein, the method is applied to a data switching device, the data switching device comprises at least two boundary hardware modules and at least one optical forwarding module, and the at least two boundary hardware modules comprise a second boundary hardware module, the method comprises:
matching, with a first data forwarding table, signaling message information for a signaling message sent by a host router, if the matching is successful, acquiring a service request sent by the host router, and searching a second data forwarding table for an optical channel for the service request; wherein, the first data forwarding table is a forwarding table for matching the signaling message sent by the host router; the second data forwarding table is configured for determining the optical channel for the service request sent by the host router;
mapping, for each optical forwarding module that is determined to be used for forwarding the service request based on the optical channel, the service request to a second service request with a granularity corresponding to a granularity of this optical forwarding module, and forwarding the second service request to the last optical forwarding module of the at least one optical forwarding module in sequence via the optical channel, such that the last optical forwarding module de-maps the second service request to the service request and forwards the service request to the second boundary hardware module;
receiving the service request, acquiring, from a third data forwarding table, next-hop routing information of the data switching device for the service request, and forwarding the service request to a next-hop router of the data switching device; wherein, the third data forwarding table is a routing table for storing routing information.

8. The data transmission method of claim 7, wherein, the at least two boundary hardware modules further comprise a first boundary hardware module, and the first data forwarding table is established by:
receiving an ARP request sent from the host router via the first boundary hardware module, replying to the host router with a MAC address of the data switching device requested by the ARP request, and
establishing the first data forwarding table based on pre-acquired various parameter information, the MAC address and the IP address of the data switching device.

9. The data transmission method of claim 8, wherein, the at least two boundary hardware modules comprise multiple first boundary hardware modules and multiple second boundary hardware modules;
establishing the first data forwarding table based on pre-acquired various parameter information, the MAC address and the IP address of the data switching device, comprises:
establishing a routing protocol forwarding table based on pre-acquired identification information and port information of the first boundary hardware modules, an IP address and an MAC address of each of host servers connected to the first boundary hardware modules, identification information and port information of the second boundary hardware modules, an IP address and a MAC address of each of host servers connected to the second boundary hardware modules, and the IP address and the MAC address of the data switching device; and
encapsulating the routing protocol forwarding table to generate the first data forwarding table to be delivered to a corresponding first boundary hardware module.

10. The data transmission method of claim 8, wherein, the second data forwarding table is established by:
acquiring an IP address and an MAC address of the host router;
acquiring port information and identification information of the first boundary hardware module that receives the ARP request;
establishing Table 1 by using the IP address and the MAC address of the host router;
establishing Table 2 by using the IP address of the host router and the port information of the first boundary hardware module that receives the ARP request;
establishing Table 3 by using the port information of the first boundary hardware module that receives the ARP request, the identification information of the first boundary hardware module, port information and identification information of the second boundary hardware module;
combining Table 1, Table 2 and Table 3 to form Table 4 comprising the IP address, the MAC address, the port information and the identification information of the first and second boundary hardware modules; and encapsulating Table 4 to generate the second data forwarding table to be delivered to the corresponding first boundary hardware module, optical forwarding module and second boundary hardware module.

* * * * *